United States Patent
Davis (10) Patent No.: US 9,187,004 B1
(45) Date of Patent: Nov. 17, 2015

(54) ELECTRIC VEHICLE CAROUSEL BATTERY EXCHANGE/CHARGING SYSTEM

(71) Applicant: Harold William Davis, Houston, TX (US)

(72) Inventor: Harold William Davis, Houston, TX (US)

( * ) Notice: Subject to any disclaimer, the term of this patent is extended or adjusted under 35 U.S.C. 154(b) by 0 days.

(21) Appl. No.: 14/678,341

(22) Filed: Apr. 3, 2015

(51) Int. Cl.
  *H01M 10/46* (2006.01)
  *B60L 11/18* (2006.01)
  *B60S 5/06* (2006.01)

(52) U.S. Cl.
  CPC ......... *B60L 11/1822* (2013.01); *B60L 11/1824* (2013.01); *B60S 5/06* (2013.01)

(58) Field of Classification Search
  CPC ... B60K 1/04; B60L 11/1822; B60L 11/1877; B60S 5/06
  USPC ............. 29/402.08, 729; 414/395, 399, 282; 320/109, 104; 700/213, 215, 218; 701/2
  See application file for complete search history.

(56) References Cited

U.S. PATENT DOCUMENTS

| | | | |
|---|---|---|---|
| 4,334,819 A | 6/1982 | Hammerslag | |
| 4,450,400 A | 5/1984 | Gwyn | |
| 5,452,983 A | 9/1995 | Parmley, Sr. | |
| 5,612,606 A | 3/1997 | Guimarin | |
| 5,668,460 A * | 9/1997 | Lashlee et al. | 320/109 |
| 5,760,569 A | 6/1998 | Chase, Jr. | |
| 5,951,229 A | 9/1999 | Hammerslag | |
| 5,998,963 A | 12/1999 | Aarseth | |
| 6,094,028 A * | 7/2000 | Gu et al. | 320/109 |
| 7,004,710 B1 * | 2/2006 | Quade | 414/395 |
| 7,201,384 B2 | 4/2007 | Chaney | |
| 8,164,300 B2 | 4/2012 | Agassi | |
| 8,710,795 B2 | 4/2014 | Scheucher | |
| 2011/0106294 A1 * | 5/2011 | Bebbington | 700/215 |
| 2014/0250653 A1 * | 9/2014 | Droste | 29/402.08 |

* cited by examiner

*Primary Examiner* — Minh Trinh
(74) *Attorney, Agent, or Firm* — Mary J. Gaskin (57) ABSTRACT

A system providing a driver of an electric vehicle with the ability to exchange a depleted battery with a charged battery. Information regarding the status of an electric battery is transmitted to service stations, and information is returned to a driver indicating the location of a service station with a charged battery. The driver enters the station and is automatically positioned next to a rotating carousel. A robotic arm removes the depleted battery from the vehicle and pulls it onto the carousel, which rotates and deposits the battery onto a return conveyor belt, which carries the battery to a transportation platform for movement to a battery rack for charging. The transportation platform removes a charged battery from the battery rack and carries it to an outgoing conveyor belt, which carries it to the carousel, which rotates until the battery is next to the vehicle for insertion by the robotic arm.

7 Claims, 9 Drawing Sheets

ELECTRIC VEHICLE CAROUSEL BATTERY EXCHANGE/CHARGING SYSTEM

FIELD OF THE INVENTION

The present invention relates to a system that can be implemented in roadside stations to enable owners of electrically-powered vehicles to exchange depleted or discharged batteries with charged batteries, thereby improving their mobility.

BACKGROUND OF THE INVENTION

The widespread adoption of vehicles powered by electrical batteries has been impeded by their limited mobility. An owner can use an electrically-powered vehicle (hereinafter "electric vehicle") to drive to work, to shop, and to perform errands, but he must keep in mind his distance from his power source, which is typically his garage. The vehicle's battery is plugged into the home's power source in the evening so that it can be charged overnight. While the vehicle serves its purpose for commuting and for local trips, presently it cannot be depended upon by a driver to use when driving long distances or when taking a vacation away from home.

A need exists for roadside stations which enable the owner of an electrical vehicle to exchange his vehicle's discharged or depleted batteries with charged batteries, in a short amount of time.

SUMMARY OF THE INVENTION

The present invention is designed to increase the popularity of electric vehicles by providing their owners with unlimited mobility, security and confidence, namely by providing service stations that will keep the batteries in their vehicles charged at all times.[1]

[1] Presently, manufacturers use stationary batteries in their electrically-powered vehicles. The present invention anticipates the move to portable electrical batteries or battery modules.

The present invention envisions a network of service stations that will be conveniently located on highways. Current wireless technology can be used to monitor an electrical battery's power level as it discharges and to locate nearby service stations. When the battery reaches a pre-determined "low" level, the driver will be alerted to stop at a service station to exchange the battery for a charged batter. Ideally, the information regarding the vehicle's make and model and its particular battery is transmitted to the service station, so that the automated system can come into play to implement the battery exchange process.

When the driver reaches the service station, he will be instructed to enter a particular lane and drive onto a track conveyor. The automated process positions the vehicle on the conveyor, which carries the vehicle to the carousel station. The driver releases the cover of the battery compartment, and a robotic arm extracts the depleted battery from the compartment, pulling it out onto the carousel. The carousel then rotates to the next position, where a charged battery has been conveyed by the process described infra. The robotic arm pushes the battery into the empty battery compartment. The process is repeated if there is more than one battery to be exchanged. After the battery or batteries have been exchanged, the vehicle is conveyed to the exit lane, and the driver closes the cover of the battery compartment and exits the service station.

The process for selecting and delivering the correct battery to the vehicle is also an automated process. A computer will receive the information transmitted by the electrically-powered vehicle regarding the type of vehicle and battery. The computer will direct the movements of an overhead crane, which will select a battery platform and secure it in place by lowering it into a pin and eyelet. A robotic arm pulls the correct battery from its charging compartment onto the platform. The platform with the battery will be transported to an out-going gravity conveyor. The battery reaches the conveyor belt, which will transport the battery to its position on the carousel, where a robotic arm will place it into the battery compartment of the waiting vehicle.

An object of the present invention is to increase the public's demand for using electric vehicles.

Another object of the present invention is to provide owners of electric vehicles with the ability to exchange their vehicles' depleted electrical batteries, no matter what size or type, for charged electrical batteries.

Yet another object of the present invention is to provide service stations that can process the battery exchanges in as little time as the task of re-fueling a vehicle's gas tank, making such exchanges both easy and convenient.

A still further object of the present invention is to provide service stations that can charge depleted batteries so that they are ready for reinstallation into another electric vehicle.

One more object of the present invention is to provide a system and service stations which can be conveniently located on highways, thereby improving the mobility of electric vehicles.

BRIEF DESCRIPTION OF THE PREFERRED EMBODIMENT

The system of the present invention is designed to incorporate a linear movement of a depleted battery from the time it is removed from a vehicle until the time, after re-charging, that it is re-introduced into a similar electric vehicle.

Figure 1:
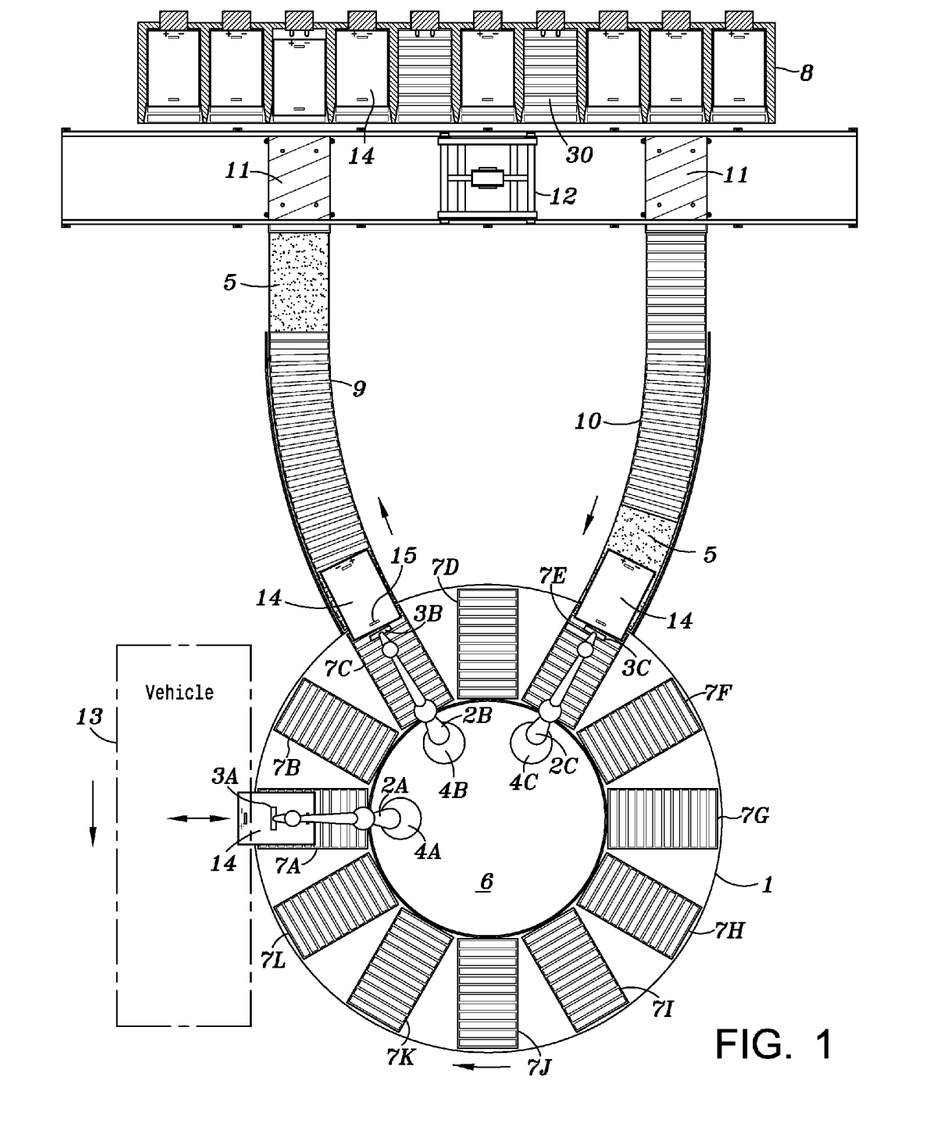
FIG. 1 is a top plan view of the battery exchange/charging system of the present invention.

As shown in FIG. 1, the exchange/charging system of the present invention comprises a horizontal, circular, rotating carousel 1 with an even number of rectangular roller conveyor sections 7 (here shown as 7A, 7B, 7C, 7D, 7E, 7F, 7G, 7H, 7I, 7J, 7K, and 7L). A stationary circular platform 6 supports several pedestals 4 (here 4A, 4B, and 4C), each of which holds a robotic/mechanical arm 2 (here 2A, 2B, and 2C). There will be three or four robotic/mechanical arms 2, depending on the configuration of the system. The robotic/mechanical arms 2 are used to either remove or install a battery 14 from or into an electric vehicle 13, using its blade 3 (here 3A, 3B, and 3C), which is inserted into the slot 15 of the battery 14. The batteries 14 are transported between the transportation platform landing area 11 and the carousel 1 on curved, roller-type, gravity-actuated, conveyor belts (here 9, 10), each having a belt-driven section 5 that insures that the transportation platform landing area 11 and a particular conveyor section 7 on the carousel 1 are properly positioned before the battery 14 moves onto one or the other.

In operation, a vehicle 13 will stop next to the carousel 1 at roller conveyor section 7A. The robotic/mechanical arm 2A reaches out and removes the depleted battery 14 from the vehicle 13, depositing it onto empty roller conveyor section 7A of the carousel 1. The carousel 1 advances and the robotic/mechanical arm 2B pushes the depleted battery 14 onto the return conveyor belt 9, where it glides up to and then onto the motorized belt-driven section 5. When the transportation platform 12, reaches the transportation platform landing area 11, the battery 14 is transferred to the transportation platform 12. The transportation platform 12 lifts the battery 14 and aligns it with the designated empty battery-charging module 30, and the battery 14 is deposited into the designated battery charging module 30. The transportation platform 12 then aligns with a charged battery 14, which is moved onto the transportation platform 12 and taken to the outgoing transportation platform landing area 11, where the charged battery 14 is slid off onto the outgoing conveyor belt 10. When the battery 14 arrives at the carousel 1, the robotic/mechanical arm 2C reaches out and pulls the battery 14 onto the carousel 1. Meanwhile the transportation platform 12 traverses the width of the building, returning to the return conveyor belt 9, transportation platform landing area 11. The carousel 1 advances until the correct charged battery 14 is aligned with the vehicle, and a robotic arm 2 installs the battery 14. The vehicle 13 drives away and the next vehicle pulls into the space vacated by the previous vehicle 13 and the process starts again with this vehicle. This simple system is designed for speed, efficiency and completely automated operation.

Figure 2:
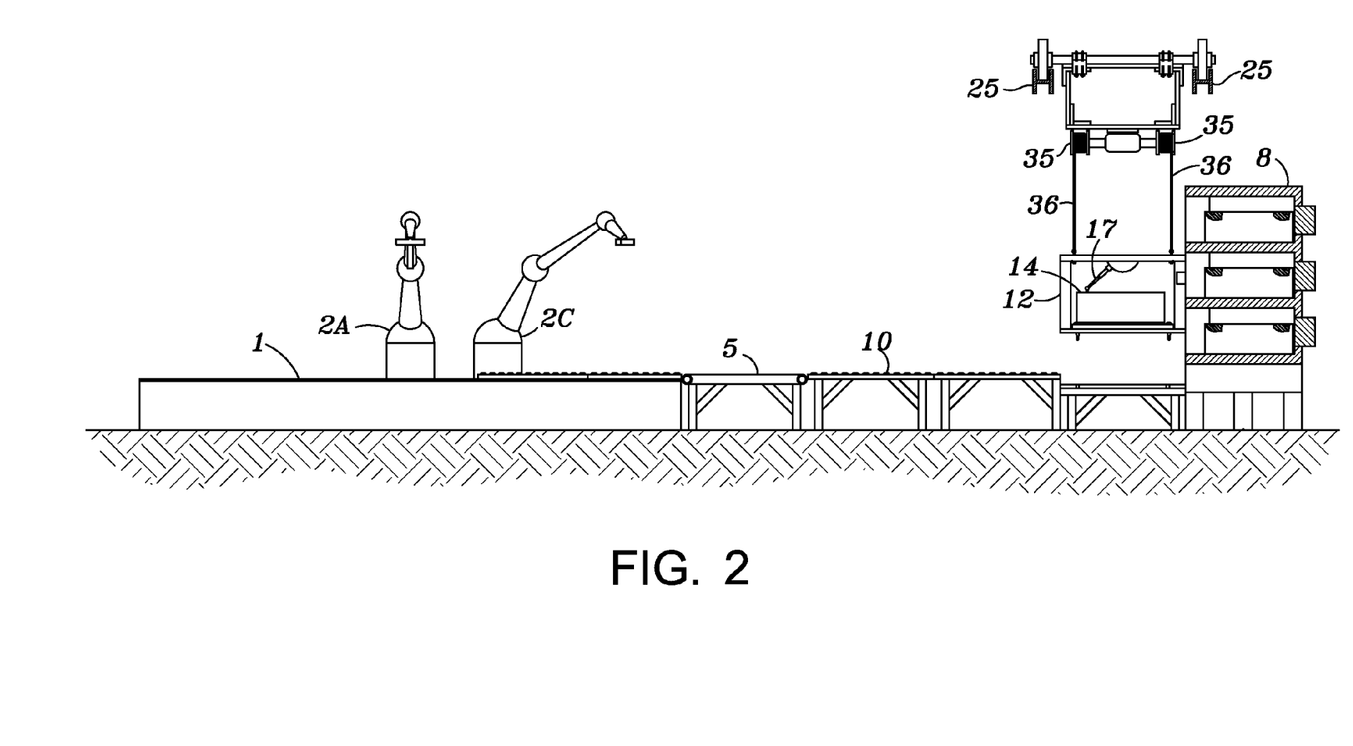
FIG. 2 is a side plan view of battery exchange/charging system of the present invention, showing the gravity-actuated conveyer for transporting the batteries and the robotic arms for removing/installing the batteries out of and into vehicles.

FIG. 2 shows a side plan view of the present invention, showing the robotic arms 2A, 2C and the carousel 1. Conveyor section 7E receives batteries carried down the outgoing conveyor belt 10 with belt-driven section 5. The lower portion of the transportation platform 12 with ceiling-mounted robotic/mechanical arm 17 is supported by four cables 36, which provide for its vertical movement by winding or unwinding the two dual drum winches 35 mounted underneath the assembly, shown in detail in FIG. 10. The transportation platform 12 travels horizontally along the side of the battery rack 8 by rolling on I-beams 25.

Figure 3:
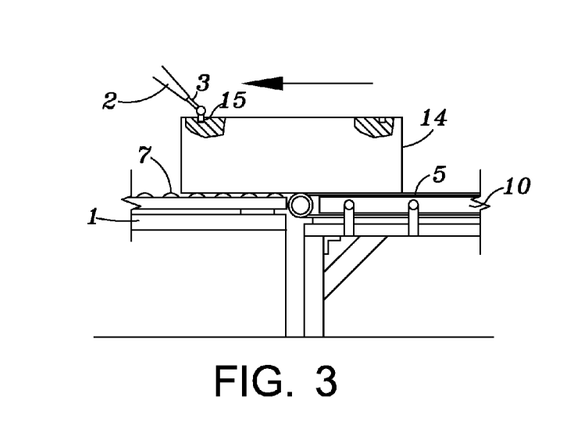
FIG. 3 is a detail view showing the removal of a battery from the outgoing conveyor belt onto the carousel

In FIG. 3, the blade 3 of a robotic/mechanical arm 2 has been inserted into the slot 15 of a charged battery 14 located on the outgoing conveyor belt 10, and the robotic arm 2 will pull the battery 14 onto a conveyor section 7 of the carousel 1 with the assistance of the motorized belt-driven section 5.

Figure 4:
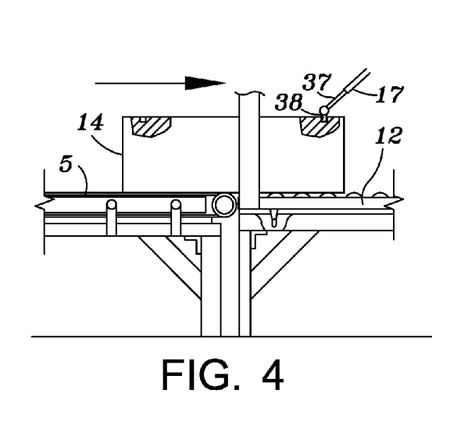
FIG. 4 is a detail view showing the installation of a battery from the incoming conveyor belt onto the transportation platform.

As shown in FIG. 4, the depleted battery 14 is being pushed onto the transportation platform 12 with the assistance of the motorized belt-driven section 5, and the blade 37 of the ceiling-mounted robotic/mechanical arm 17 is being inserted into a slot 38 in the battery 14 to pull or lift the battery 14 onto the transportation platform 12.

Figure 5:
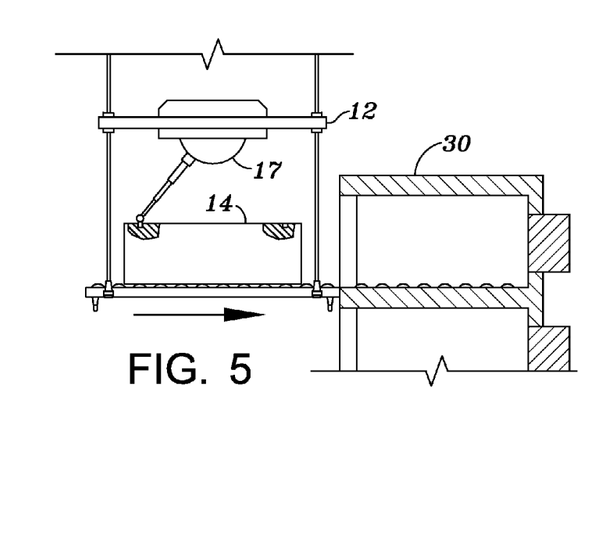
FIG. 5 is a detail view showing the installation of a battery from the transportation platform into the battery-charging module.

As shown in FIG. 5, once the depleted battery 14 is positioned on the transportation platform 12, the transportation platform 12 will carry the depleted battery 14 to a predetermined battery charging module 30 and, using a pushing motion, the robotic/mechanical arm 17 will deposit the depleted battery 14 into the appropriate battery charging module 30.

Figure 6:
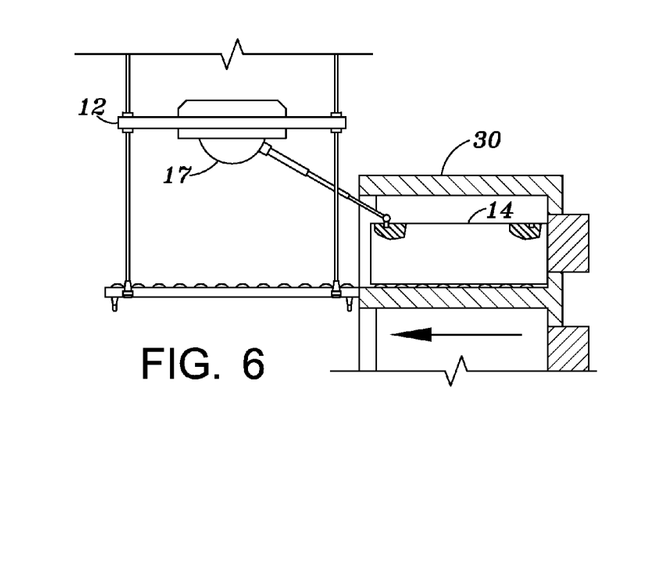
FIG. 6 is a detail view showing the removal of a battery from the battery-charging module onto the transportation platform.

As shown in FIG. 6, after depositing the depleted battery 14 into the battery charging module 30, the transportation platform 12 will then move to the next predetermined battery charging module 30 and the robotic/mechanical arm 17 will remove the charged battery 14 from the battery charging module 30 with a pulling motion and deposit the charged battery 14 onto the transportation platform 12.

Figure 7:
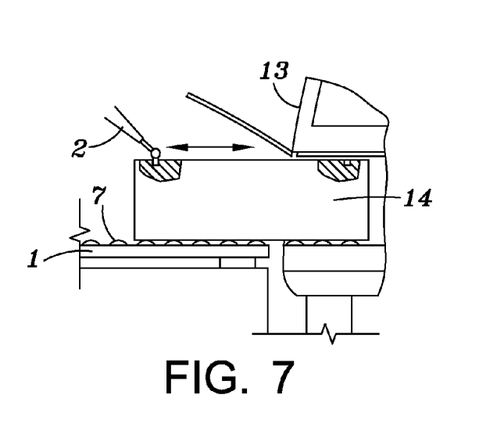
FIG. 7 is a detail view showing both the removal of a battery from the vehicle onto the carousel and the installation of a battery from the carousel into the vehicle.

FIG. 7 shows both the removal of the battery 14 from the vehicle 13 onto a conveyor section 7 of the carousel 1 and the installation of the battery from the carousel 1 into the vehicle 13, in both instances using the robotic/mechanical arm 2.

Figure 8:
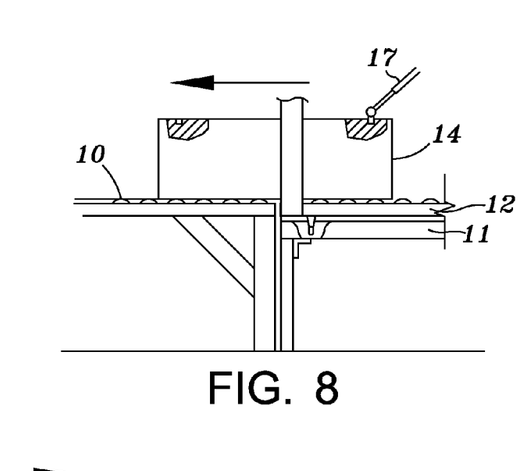
FIG. 8 is a detail view showing the removal of a battery from the transportation platform onto the outbound conveyor belt going to the carousel.

Once the transportation platform 12 is positioned at the transportation platform landing area 11, a charged battery 14 will be pushed onto the outgoing gravity-motivated conveyor belt 10 by the robotic/mechanical arm 17, as shown in FIG. 8.

Figure 9:
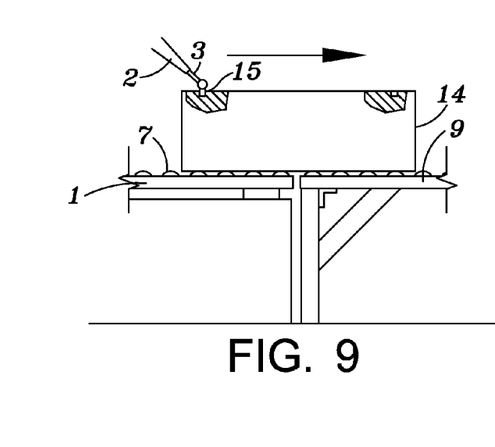
FIG. 9 is a detail view showing the removal of a battery from the carousel to the incoming conveyor belt going towards the battery racks.

As shown in FIG. 9, the blade 3 of the robotic/mechanical arm 2 has been inserted into the slot 15 of the depleted battery 14 resting on a conveyor section 7 on the carousel 1, directly aligned with the return conveyor belt 9. The arm 2 pushes the battery 14 onto the return conveyor belt 9, where it will slowly glide towards the battery rack 8.

Figures 10, 10A:
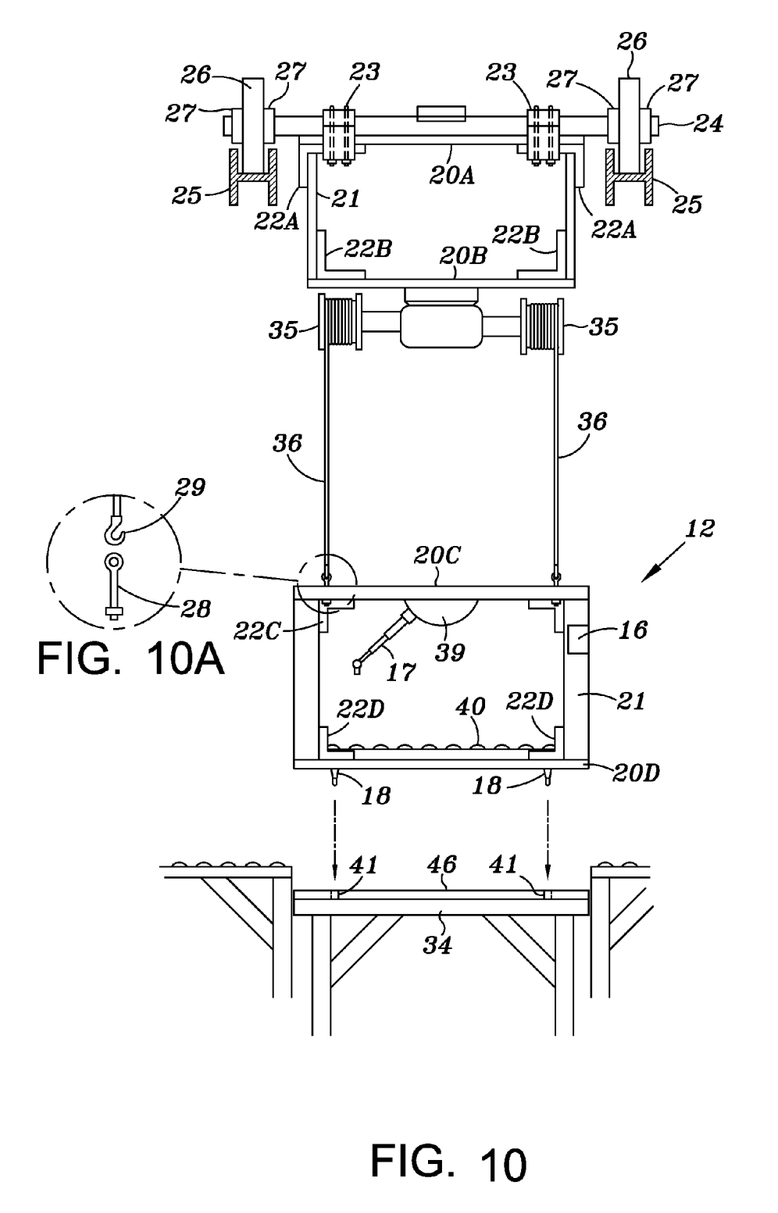
FIG. 10 is a side view of the transportation platform showing its alignment with the transportation platform landing area.
FIG. 10A is a detail view showing one of the hooks on an end of a cable hung from one of the dual winches, the hook being attached to an eyelet attached to a corner of the transportation platform, a system of four such connections being used to align the transportation platform
Figures 11, 11A:
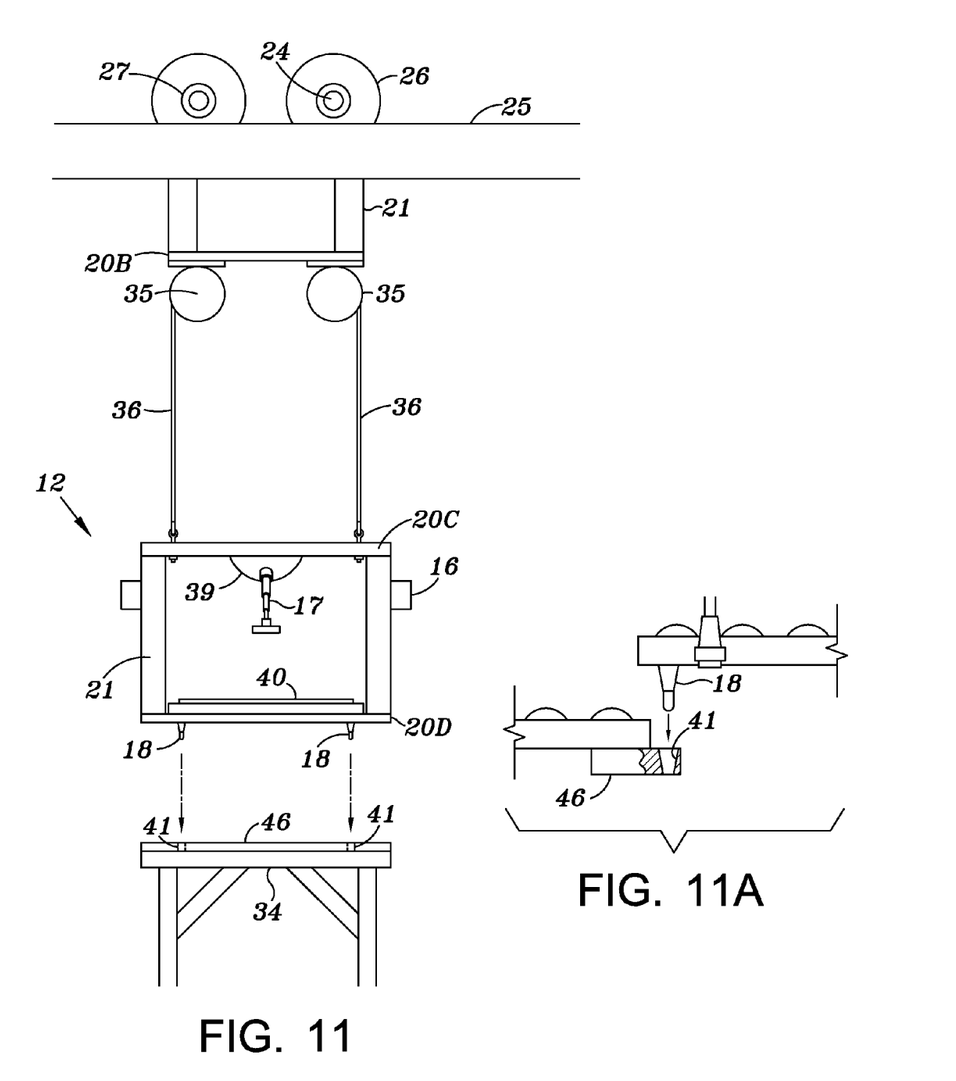
FIG. 11 is a front plan view of the transportation platform showing its alignment with the transportation platform landing area.
FIG. 11A is a detail view showing the insertion of an alignment pin used to insure that the transportation platform is properly positioned with the conveyor belt.

Referring to FIG. 10 and FIG. 11, the transportation platform 12 is designed to travel horizontally on the two I-beams 25 alongside the battery rack 8 (not shown). The upper portion of the transportation platform 12 has four steel wheels 26 with bearings. Each pair of wheels 26 is attached to a round steel bar axle 24, with a collar 27 on either side of each wheel 26. Below the axles 24, a first steel plate 20A is attached by eight U-bolts 23, four pairs of two each, to the axles 24. Welded to the underside of the first steel plate 20A are two steel angle pieces 22A, one along each edge. The upper portions of four vertical steel bars 21 are welded to the steel angle pieces 22. A second steel plate 20B forming the bottom of the upper portion of the transportation platform 12 is welded to steel angle pieces 22B. The lower portion of vertical steel bars 21 are welded to steel angles 22B, to complete the upper portion of the transportation platform 12.

Welded to the underside of the second steel plate 20B are two dual drum winches 35. Attached to each of the four winch cables 36 is a steel hook 29, which is attached to a steel eyelet 28 (see detail FIG. 10A) that has been welded to the upperside of a third steel plate 20C. Welded horizontally to the underside of the third steel plate 20C are two steel angles 22C, one along each edge. The upper portion of the vertical steel bars 21 are welded to the steel angle pieces 22C. A fourth steel plate 20D forming the bottom of the lower portion of the transportation platform 12 is welded to steel angle pieces 22D. The lower portion of the vertical steel bars 21 are welded to steel angle pieces 22D, to complete the lower portion of the transportation platform 12.

A single roller conveyor section 40 has been welded onto the upperside of the fourth steel plate 20D in order to assist in the placement of the battery 14 (not shown). The arm support 39 of the ceiling-mounted robotic/mechanical arm 17 has been welded to the underside of the third steel plate 20C as shown in FIG. 10 and FIG. 11. The robotic/mechanical arm 17 will be used for the installation/removal of the batteries 14 to and from the transportation platform 12.

The transportation platform 12 incorporates two electromagnets 16, each one attached to a steel bar 21, facing the battery rack 8. The electromagnets 16 will be energized once the transportation platform 12 is positioned in front of the battery charging module 30 into or out of which the battery 14 is to be installed or removed (not shown) in order to stabilize the movement of the transportation platform 12.

The alignment of the transportation platform 12 at the transportation platform landing area 11 is accomplished using four pins 18, each of which will be inserted into a pre-drilled hole 41 in the steel plate 46 of the transportation platform landing area support 34, as shown in FIG. 11A. This section can be reinforced using steel bar supports. The transportation platform landing area support 34 will be recessed in order for the transportation platform 12 to align properly with the return conveyor belt 9 and the outgoing conveyor belt 10.

Figure 12:
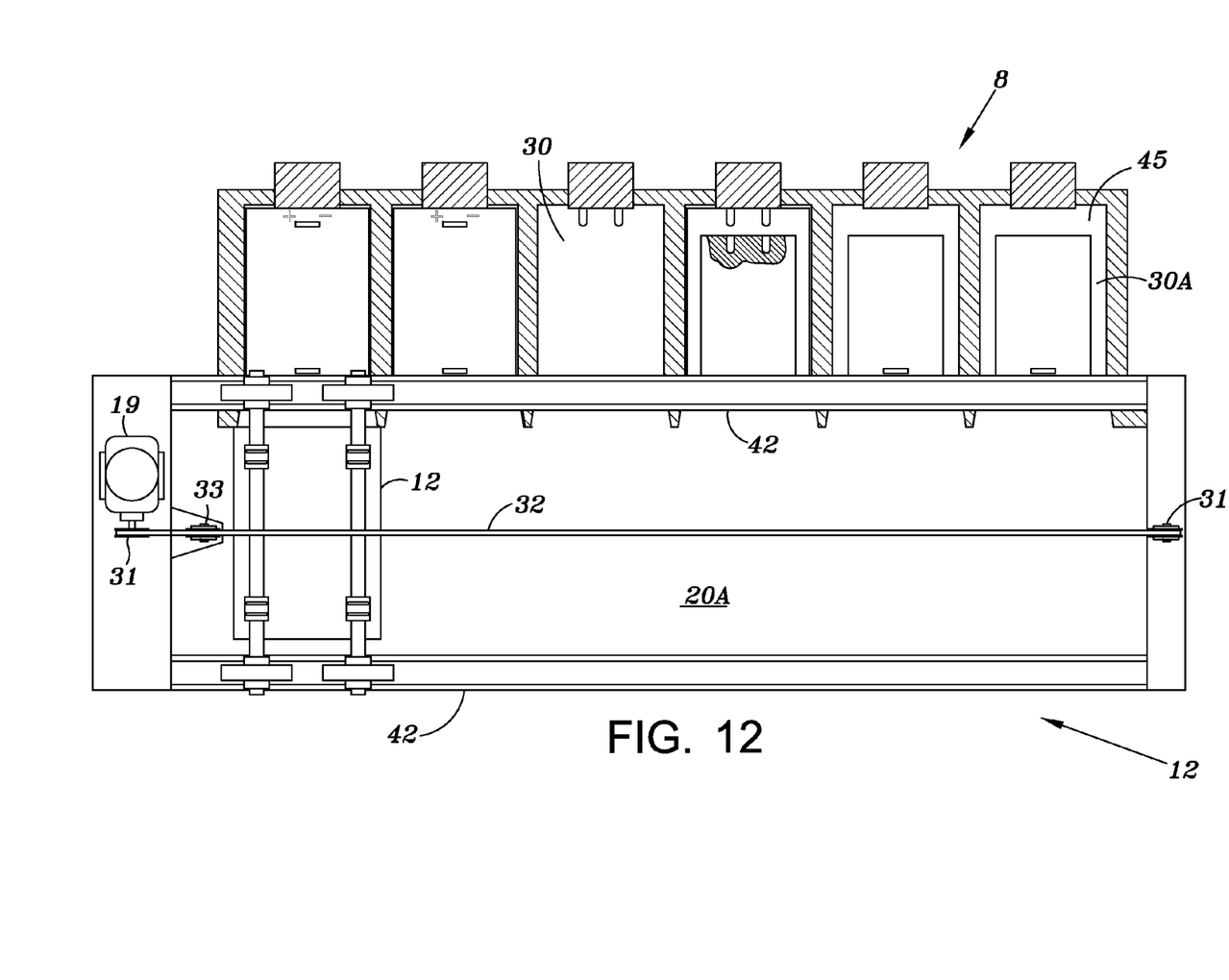
FIG. 12 is a top plan view of the battery charging racks and the transportation platform.
Figure 13:
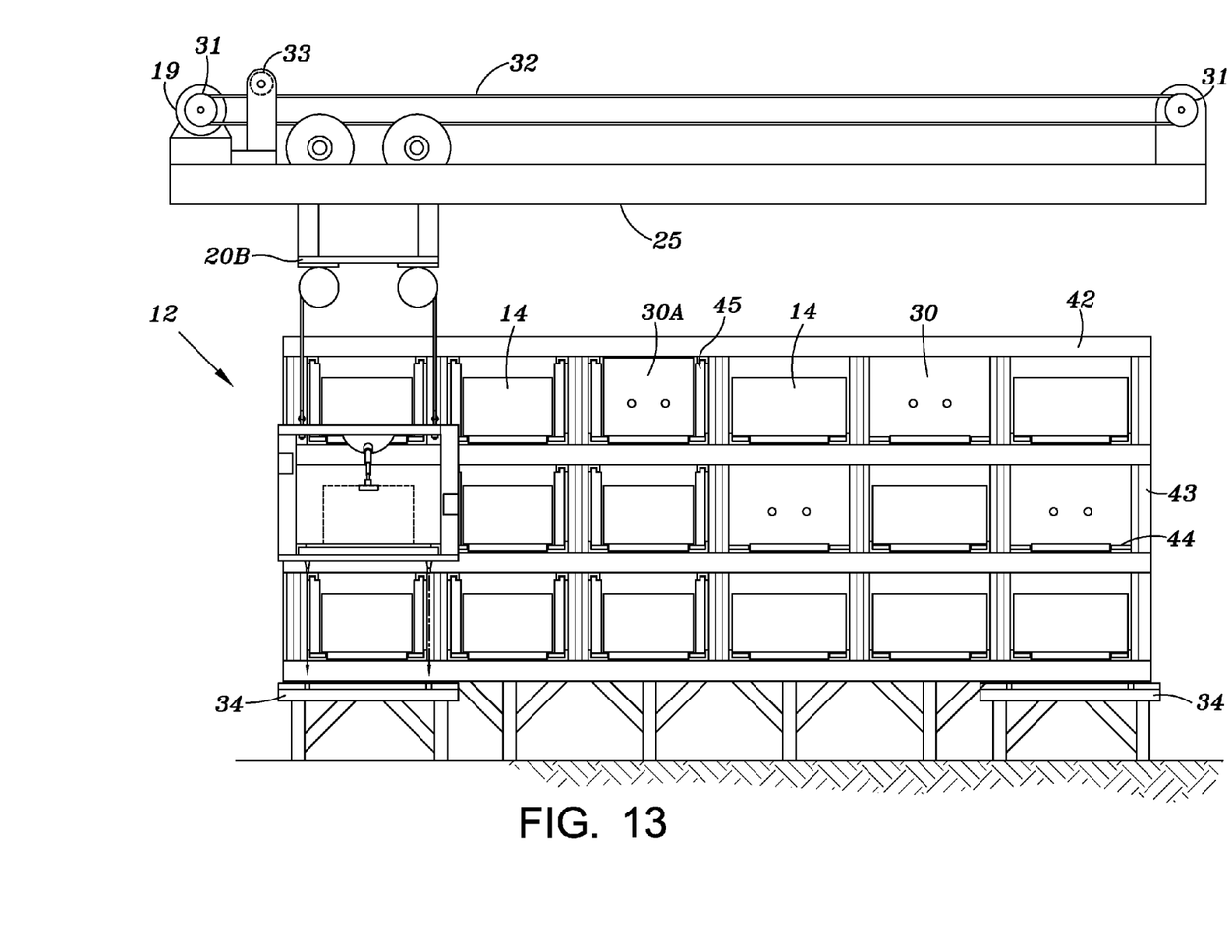
FIG. 13 is a front plan view of the battery charging racks and the transportation platform.

As shown in FIG. 12 and FIG. 13, the battery rack 8 is constructed from horizontal I-beams 42 welded to vertical I-beam support columns 43. The battery rack 8 will run the width of the building between the transportation platform landing areas 11, as shown in FIG. 13. Welded between the support columns 43 and connecting them are plate steel panels 44. Battery charging modules 30 are placed along the plate steel panels 44 and secured; they provide a place for the batteries 14 to receive a charge. (The battery charging systems will be supplied by the manufacturers of the batteries.) The battery rack 8 will be capable of charging all electric vehicle batteries, regardless of their size. The battery charging module 30 depicts a front and overhead view of a normal battery charging module 30. The battery charging module 30A is designed for charging a smaller-sized battery, with an insert 45 specifically designed to allow for charging any size battery 14; it insures that the battery charging module 30A maintains the proper alignment for use with the transportation platform 12, as shown in FIG. 12.

The transportation platform 12 will be driven using a DC motor 19 affixed to a sprocket 31 and chain 32. The chain 32 will be welded to the upper steel plate 20A (not visible in this view) of the transportation platform 12 and looped around an adjacent sprocket 31 at the other end of the battery rack 8, as shown in FIG. 13. To insure that the chain 32 maintains the proper tension, a chain tensioner 33 will be incorporated.

Figure 14:
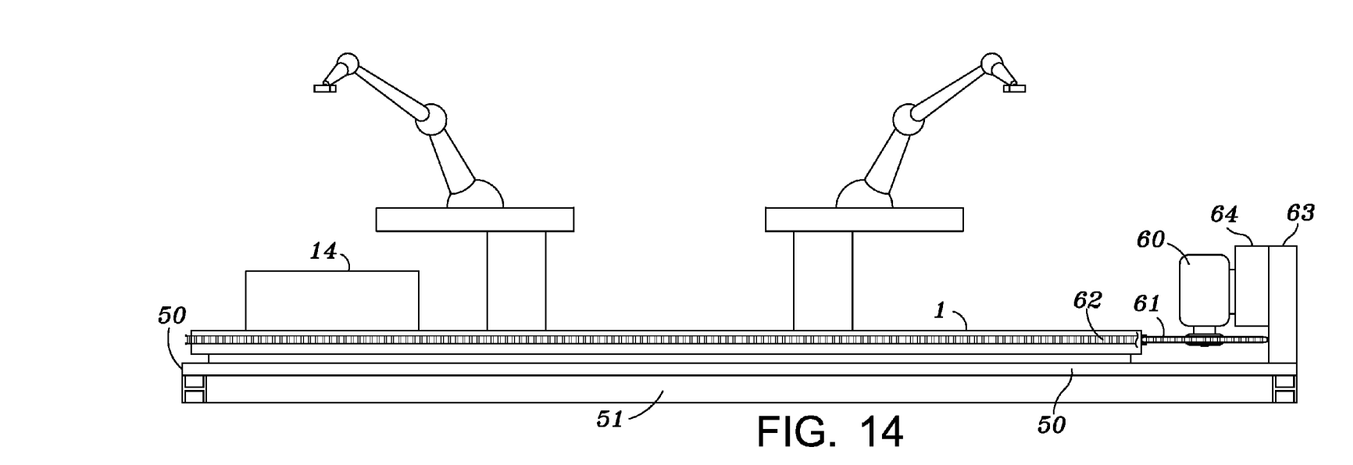
FIG. 14 is partial side plan view of the carousel and one of the robotic/mechanical arms.
Figure 15:
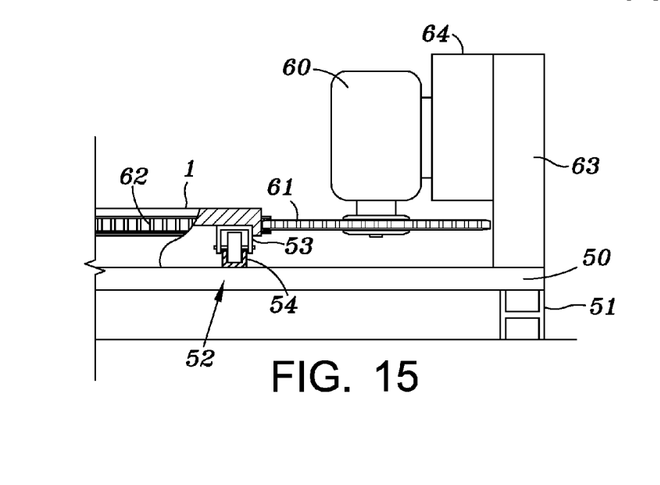
FIG. 15 is a detail view of the DC motor mounting bracket and the chain and sprocket interconnection for the rotation of the carousel.

As seen in FIG. 14 and FIG. 15, the carousel 1 makes it possible to exchange batteries 14 quickly and efficiently. The carousel 1 will be supported using a steel plate platform 50 welded to an I-beam support frame 51, as shown in FIG. 14. The carousel 1 will ride on roller bearing assembly 52 consisting of two pieces, the roller bearing ring 53 and the bearing race ring 54. The roller bearing ring 53 will be welded to the underside of the carousel 1, and the bearing race ring 54 will be welded to the topside of the steel plate platform 50, as shown in FIG. 15. The carousel 1 will require two roller bearing assemblies 52, one at its outer diameter and one at the inner diameter. The carousel 1 will be driven by a DC motor 60 fitted with a sprocket 61 and inserted into a chain 62 welded to the outside circumference of the carousel's steel plate platform plate 50, as shown in FIG. 14. The support for the DC motor 60 will be an I-beam support column 63 welded to a steel angle mounting bracket 64, as shown in FIG. 15.

Figure 16:
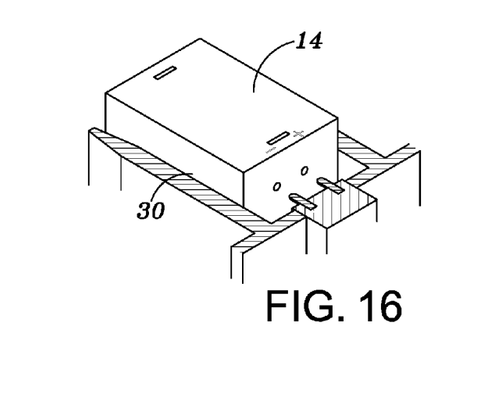
FIG. 16 is a detail view of the battery charging module along with the self-aligning guides.

To insure that the batteries 14 are properly aligned during the complete process, guides can be incorporated at every transition point so that the positioning of the battery 14 will remain exact, as shown in FIG. 16.

Owners of electric battery vehicles can plan to take long automobile trips using Wi-Fi and GPS technology, and relying on the exchange stations utilizing the battery exchange system of the present invention. At the beginning of the trip, the battery is fully charge. The vehicle's computer monitors the battery level and is in constant cellular communications with all the surrounding exchange stations along the route. After approximately 225 miles, the vehicle's computer alerts the driver that the battery has 25% capacity remaining. The driver has no concerns because the computer has also notified him of all the stations within the area that have a fully charged battery for his vehicle. Once the driver makes his choice, the GPS directs the driver to the appropriate station. As the driver approaches the station, the computer directs the driver to the lane in which he will enter for the battery exchange to take place. The appropriate battery has already been pulled from the charging rack, and, as the automobile pulls up to the exchange carousel, the driver's battery is the next in line. The robotic arm whisks away the depleted battery and installs the fully-charged battery in a matter of minutes, and, for a small fee the driver pulls away. If, for some reason, a fully-charged battery was not available, the depleted battery would be exchanged with a partially-charged one, approximately 75% to 90% capacity, and the fee would reflect this. The driver could complete his journey with little or no inconvenience. Because the system of the present invention is designed to be fully automated, stations would never need to be closed and, in case of power failure, a backup generator would suffice. When planning his trip, a driver could book hotel reservations at a hotel with charging terminals so as to avoid having to worry about having his vehicle's battery charged for local travel. The next morning the battery would be fully charged.

Although the present invention has been described with reference to preferred embodiments, it will be understood by those skilled in the art that additions, modifications, substitutions, deletions and other changes not specifically described are possible, and that the details herein are to be interpreted as illustrative and not as self-limiting. The preferred embodiment describes the system of the present invention as it would operate utilizing the configuration of a single-lane carousel and a single battery exchange station. This configuration works well for small volumes of traffic, but can be expanded with the addition of multiple service islands. To satisfy higher volumes of traffic flow and the need for a quick turnaround, a configuration using a single carousel with two lanes could be built, whereby cars would travel in opposite directions. An additional robotic/mechanical arm 2 would be incorporated to service the vehicle occupying the second lane. Other configurations are also possible. For instance, in areas with extremely high volumes of traffic, each island could incorporate two carousels, with a central battery rack in between them, with each carousel incorporating an additional robotic/mechanical arm 2, allowing servicing of four vehicles at a time. The operation of the transportation platform would be synchronized to make sure the correct charged batteries are sent to the correct automobile for installation.

I claim:

1. A system for exchanging a removable depleted battery from a battery-powered electric vehicle and replacing the depleted battery with a charged battery, the system comprising:
    a horizontal circular rotating carousel disposed around a circular central platform, the carousel supporting a plurality of radial rectangular roller conveyor sections, each of said conveyor sections extending from an outer circumference of the central platform to an outer circumference of the carousel;
    a plurality of robotic arms mounted on an upper surface of the central platform, each of said robotic arms having means for lifting the removable depleted battery from the vehicle and replacing it with a charged battery;
    a return conveyor belt disposed between the outer circumference of the carousel and a first transportation platform landing area, the return conveyor belt used for transporting the depleted battery from a first roller conveyor section to the first transportation platform landing area;
    an outgoing conveyor belt disposed between the outer circumference of the carousel and a second transportation platform area, the outgoing conveyor belt designed for transporting the charged battery from the second transportation platform landing area to a second roller conveyor section;
    a battery storage rack having a plurality of charging modules for charging depleted batteries and storing charged batteries;
    a transportation platform located adjacent to the battery storage rack, the transportation platform used for transporting the depleted battery from the first transportation platform landing area to one of the modules in the battery storage rack for charging and for removing the charged battery from one of the modules in the battery storage rack and transporting the charged battery to the second transportation platform landing area.

2. The system of claim 1 which further includes:
    means for automatically positioning the electric vehicle next to the rotating carousel.

3. The system of claim 1 wherein the transportation platform has a ceiling and which further comprises:
    a ceiling-mounted robotic arm for moving the battery.

4. The system of claim 1 which further comprises:
    a system of horizontal I-beams and wheels mounted above the transportation platform for moving the transportation platform horizontally; and
    a system of dual-drum winches and cables mounted above the transportation platform for moving the transportation platform vertically.

5. The system of claim 1 which further comprises:
    a first direct current motor affixed to a sprocket and chain assembly, the motor driving the transportation platform.

6. The system of claim 1 which further comprises:
    an insert disposed in a charging module for a small battery.

7. The system of claim 1 which further comprises:
    two roller bearing assemblies upon which the carousel rides; and
    a second direct current motor for driving the carousel.

* * * * *